(12) United States Patent
McCampbell

(10) Patent No.: US 7,285,301 B2
(45) Date of Patent: *Oct. 23, 2007

(54) METHOD FOR PRODUCING NUTRITIONALLY BALANCED FOOD COMPOSITIONS

(75) Inventor: Clyde A. McCampbell, Stafford, NY (US)

(73) Assignee: Entra-Safe, Inc., Nashville, TN (US)

( * ) Notice: Subject to any disclaimer, the term of this patent is extended or adjusted under 35 U.S.C. 154(b) by 615 days.

This patent is subject to a terminal disclaimer.

(21) Appl. No.: 10/897,188

(22) Filed: Jul. 22, 2004

(65) Prior Publication Data

US 2005/0003054 A1    Jan. 6, 2005

Related U.S. Application Data

(63) Continuation-in-part of application No. 10/194,793, filed on Jul. 12, 2002, now Pat. No. 6,921,548.

(51) Int. Cl.
*A23L 1/0524* (2006.01)
*A23B 4/00* (2006.01)
*A23B 4/12* (2006.01)

(52) U.S. Cl. ............... 426/321; 426/335; 426/519; 426/521; 426/577; 426/634

(58) Field of Classification Search ........... 426/321, 426/335, 519, 521, 577, 634
See application file for complete search history.

(56) References Cited

U.S. PATENT DOCUMENTS

| | | | |
|---|---|---|---|
| 4,081,555 A | 3/1978 | Sawhill | |
| 4,112,123 A | 9/1978 | Roberts | |
| 4,199,608 A | 4/1980 | Gilmore et al. | |
| 4,452,823 A | 6/1984 | Connolly et al. | |
| 4,542,035 A | 9/1985 | Huang et al. | |
| 4,631,196 A | 12/1986 | Zeller | |
| 4,711,953 A | 12/1987 | Roger et al. | |
| 4,771,001 A | 9/1988 | Bailey et al. | |
| 4,830,868 A | 5/1989 | Wade et al. | |
| 4,931,300 A | 6/1990 | Monte | |
| 5,156,875 A | 10/1992 | Monte | |
| 5,186,971 A | 2/1993 | Girsh | |
| 5,389,391 A | 2/1995 | Monte | |
| 5,401,523 A | 3/1995 | Degen et al. | |
| 5,413,804 A | 5/1995 | Rhodes | |
| 5,614,241 A | 3/1997 | Monte | |
| 5,948,452 A | 9/1999 | Monte | |
| 6,423,354 B1 * | 7/2002 | Monte | 426/72 |

FOREIGN PATENT DOCUMENTS

EP    0914 779    12/1999

OTHER PUBLICATIONS

GRINSTED SSD-5826 Stabilizer System Product Description/Specification Sheet.
GRINSTED Pectin AMD 680 Product Description/Specification Sheet.
Dow Corning AF Antifoam Emulsion Product Description/Specification Sheet.
Captex 300 Product Description/Specification Sheet.
ALANATE 309 Calcium Caseinate Product Description/Specification sheet.
Sodium Caseinste S Product Description/Specification Sheet.
CENTROLEX F Product Description/Specification Sheet.
MYVATEX 8-06 K Product Description/Specification Sheet.
Lactic Acid 88% Product Description/ Specification sheet.

* cited by examiner

*Primary Examiner*—Helen Pratt
(74) *Attorney, Agent, or Firm*—Stephen J. Stark; Miller & Martin PLLC

(57) ABSTRACT

This invention relates to a process for manufacturing nutritionally balanced food compositions suitable for retort sterilization which have a low pH, extended shelf life, high antimicrobial activity, and which include protein in a stable emulsion. The primary protein source for the food composition is caseinates or milk protein concentrates and isolates comprised mostly of casein. Alternately, milk protein concentrates, milk protein isolates, milk protein hydrolystates, soy protein isolates or soy protein concentrates may also be used. The process includes two homogenization steps.

106 Claims, No Drawings

METHOD FOR PRODUCING NUTRITIONALLY BALANCED FOOD COMPOSITIONS

RELATED APPLICATION

This is a continuation-in-part of application Ser. No. 10/194,793, filed Jul. 12, 2002, now U.S. Pat. No. 6,921,548.

BACKGROUND OF THE INVENTION

1. Field of the Invention

This invention relates to processes for manufacturing nutritionally balanced food compositions, which may be used for oral ingestion or for ingestion along the digestive tract. More particularly, the invention relates to a method for preparing nutritionally balanced liquid food compositions suitable for retort sterilization which have a low pH, extended shelf life, high antimicrobial activity, and which include protein in a stable emulsion. The method includes the use of a novel stabilizer. The primary protein source for the food composition is caseinates. Alternative sources include milk protein concentrates, milk protein isolates, milk protein hydrolystates, whey protein concentrates, whey protein isolates, whey protein hydrolystates, soy protein concentrates and soy protein isolates.

2. Description of Related Art

Liquid nutritionally balanced food compositions are known in the art. See, for example, U.S. Pat. No. 4,931,300 to Monte for "ANTIMICROBIAL FOOD COMPOSITION." Liquid nutritionally balanced powdered food compositions like those described in U.S. Pat. No. 4,931,300 have several potential disadvantages. Protein tends to precipitate from liquid solutions which, like the food composition in U.S. Pat. No. 4,931,300, have acidic pH values in the range of 2.0 to 5.5. In particular, protein tends to precipitate from such liquid solutions when the solutions are heated to a high temperature to commercially sterilize the solutions. However, solutions with low pH values in the range of 2.0 to 5.5 are often preferred for nutritional food compositions because the acidity of the solutions normally provides a high level of antimicrobial activity. Even so, the food composition in U.S. Pat. No. 4,931,300 must be refrigerated after it is reconstituted and must then be utilized within about seventy-two hours. Even though the seventy-two hour shelf life of the reconstituted food composition is relatively short, it is still substantially longer than the shelf life of other comparable food compositions. See, for example, U.S. Pat. No. 4,112,123 to Roberts, where the shelf life of a comparable reconstituted refrigerated food composition is only about twenty-four hours.

Some attempts to address these and other problems are illustrated in U.S. Pat. Nos. 5,156,875 and 5,614,241. Each of these patents utilize a water soluble protein, preferably whey protein, in conjunction with a protein stabilizer system to control precipitation of the proteins out of the aqueous food composition.

In practice, however, the food compositions of the type described in U.S. Pat. Nos. 4,931,300, 4,112,123, 5,156,875 and 5,614,241 have each encountered continued problems with precipitation of the proteins during storage in liquid form or after reconstitution with an aqueous medium such as water. The food compositions of U.S. Pat. Nos. 5,156,875 and 5,614,241 have both been found to undergo significant precipitation of the proteins after sterilization and packaging, thereby reducing the viable shelf life of the product.

Additionally, the prior food compositions of U.S. Pat. Nos. 4,931,300, 4,112,123, 5,156,875 and 5,614,241 all required aseptic sterilization and packaging. Aseptic sterilization, also called ultra high temperature/short time (UHTST) pasteurization, is generally a more restrictive and more expensive process than the general commercial retort sterilization used in typical canning processes for food products. Aseptic sterilization has a higher failure rate than commercial retort sterilization. Therefore, aseptic sterilization requires 100% inspection for swollen containers after an incubation period of 7-10 days before shipping. In Aseptic sterilization, the product and the packaging must each be separately sterilized prior to combining in an aseptic environment. By contrast, retort sterilization allows both the packaging and the food product within it to be sterilized simultaneously. However, the retort sterilization process requires more time at lower temperature levels to achieve levels of thermo-lethality comparable to aseptic sterilization. Retort sterilization was unsuitable for the prior art food compositions because such compositions broke down with subsequent protein precipitation during the longer periods during which the products were held at higher temperatures that characterize commercial retort sterilization processes.

The food composition of the present invention may include milk proteins (casein and/or whey) or soy proteins. Milk proteins have excellent nutritional and functional properties and are widely used in the manufacture of food products. Different functionality, composition and flavor of milk protein products make them ideal for a number of uses. Milk protein is a rich source of essential amino acids. Milk is made up of approximately 3-5 percent protein which can be classified into two basic types, casein proteins and whey proteins. About 80 percent of the protein content is casein which occurs as complexes or micelles in fresh milk, while the whey proteins are soluble in the milk's serum phase. Casein forms the largest part of the total protein content in cow's milk—around 80 percent—and so it is a valuable component.

All casein products are manufactured from skim milk using a similar basic process: the casein is separated from the milk, purified by washing, and dried. However, the process is a little different according to whether rennet or acid casein is being made.

Rennet casein is mainly used to make imitation cheese which has an important role in the fast food trade, although some is also used to manufacture plastic products such as buttons. Rennet casein is generally used in the manufacturing of products.

In its insoluble form, acid casein does not presently have many uses. To make it soluble, the casein is neutralized by adding an alkali. Alternatively, caseinates (which have different properties from casein) can be made by adding different dissolving salts to the insoluble acid casein. Both acid casein and caseinates, the salts of caseins, are widely used in the food industry and they have some technical uses also. Caseinates are made by dissolving acid casein in a suitable hydroxide and drying it to make a water soluble product.

Calcium caseinate is typically manufactured from fresh skim milk by precipitation of the casein through acidification. After separation, the fresh casein curd is washed, converted to calcium caseinate and dried. Calcium caseinate has a milky appearance and smooth mouth feel, making it ideal for use in powdered diet supplements, nutritional beverages and processed cheese.

Sodium caseinate is an extremely high quality milk protein fully reacted from edible acid casein. This top quality milk protein is heat stable with excellent emulsifying and binding capabilities which contribute to the stabilization of many food applications. Sodium caseinate is used extensively in the manufacture of coffee whiteners, whipped toppings, cream liqueurs, yogurt, processed cheese and meat products.

Calcium sodium caseinate is typically manufactured from fresh skim milk by precipitation of the casein through acidification. After separation, the fresh casein curd is washed, converted to calcium sodium caseinate and dried.

Potassium caseinate is a milk protein manufactured from fresh skim milk. Potassium caseinate can be used in a verity of food and pharmaceutical products, especially where low sodium levels are required.

Magnesium caseinate is a highly soluble magnesium source with excellent emulsifying and stabilizing properties for use in nutritional applications.

For the purposes of the present invention, caseinates are not necessarily dependant upon a process for production thereof.

Casein is the primary protein in milk protein concentrates and milk protein isolates, also known as total milk proteins (TMP's). Such milk protein concentrates and isolates contain all of the proteins found in milk and generally are about 80% casein and 20% whey proteins.

As seen in the discussion above, although casein forms approximately 80% of the total protein content in cow's milk, in an acidic environment, casein is insoluble. However, for nutritional food compositions, solutions with low pH values in the range of 2.0 to 5.5 are preferred because the acidity of the solutions normally provides a high level of antimicrobial activity. Thus it can be seen that because it has such high nutritional value, it would be desirable to convert casein into caseinates and utilize caseinates or milk protein concentrates and isolates containing mostly caseinates as the source of protein in antimicrobial food compositions.

Alternatively, the food composition of the present invention may include soy protein. Foods rich in soy protein offer a good alternative to milk protein based products. Soy proteins contain all of the amino acids essential to human nutrition. Thus, soy beverage products are a good replacement for dairy beverages for lactose intolerant individuals. Additionally, foods rich in soy protein are low in saturated fat and cholesterol and may reduce heart disease. As consumers have become more health conscious and studies have demonstrated the benefits of soy products, the demand for soy products has increased dramatically.

Soy proteins are manufactured by cracking mature soybeans to remove the hulls. The remaining soy chips are then converted into flakes which retain the oil found in soybeans. Soy protein concentrates are made from defatted soy flakes which are processed to have most of the sugars removed but keep the soy fiber. Sugar can be removed from soy flakes by techniques using alcohol or water. Isolated soy protein, higher in protein content that soy protein concentrates, is the most concentrated form of soy protein. Isolated soy protein is typically manufactured by using water to extract sugar from defatted soy flakes. The protein is then precipitated and dried.

Due to the health benefits of soy products and individuals choosing more plant based foods, both soy protein concentrates and isolates are increasingly being used in food products. Soy proteins are being increasingly used in a variety of foods including processed meat, meat alternatives, baked goods and nutrition bars.

Accordingly, it would be highly desirable to provide a process for producing liquid food compositions with low viscosity, pH in the range of about 2.0 to 5.5, high antimicrobial activity, extended shelf life at room temperature and preventing protein from precipitating or settling from solution when the solution is sterilized using retort sterilization techniques.

Therefore, it is a principal object of the invention to provide an improved process for producing a food composition.

Another object of the invention is to provide a process utilizing caseinate and a novel stabilizer in the manufacture of a low pH liquid food composition, which has high antimicrobial activity and an extended shelf life.

Another object of the invention is to provide a low pH liquid food composition which is unusually stable at high temperatures and which includes caseinate as the primary protein source and which generally prevents protein from precipitating or separating from the liquid food composition.

Another object of the invention is to provide a nutritionally balanced liquid food composition, which includes a low pH protein stabilization system, has high antimicrobial activity and an extended shelf life at room temperature.

Another object of the invention is to provide a soy based low pH liquid food composition which has high antimicrobial activity and an extended shelf life at room temperature.

A further object of the invention is to provide a low pH liquid food composition which is unusually stable at high temperatures and which includes soy protein as the primary protein source and which generally prevents protein from precipitating or separating from the liquid food composition.

These and other, more specific objects and advantages of the invention will be apparent to those skilled in the art from the following detailed description thereof.

SUMMARY OF THE INVENTION

Briefly, I have discovered a method of manufacturing a low pH liquid food composition suitable for retort sterilization which has high antimicrobial activity and extended shelf life, said method utilizing caseinates or milk protein concentrates and isolates comprised mostly of caseinates as the protein source for the food composition, in addition to a novel stabilizer. Alternatively, milk protein hydrolystates, whey protein concentrates, whey protein isolates, whey protein hydrolystates, soy protein concentrates and soy protein isolates may be utilized. The food compositions that may be produced according to the present invention may be formulated as desired to achieve specific nutritional, caloric, taste, color or viscosity goals. However, the process of the present invention allows the desired results to be achieved in a low pH environment with extended shelf life without undesirable levels of protein precipitation as in prior art acidic food compositions.

The method comprises the steps of adding one or more of mineral salts (buffers), stabilizers, antimicrobial agents (preservatives), minerals and vitamins to water which has been heated to between about 120° to about 140° F. (about 48.9° to about 60° C.) under agitation and continuing such agitation for between about 5 minutes to about 10 minutes until all of the solids have dissolved to form a first solution; mixing one or more of oils, emulsifiers, anti-foaming agents, a protein source, and carbohydrates, into the first solution under agitation; heating the solution to a temperature of between about 145° to 155° F. (about 62.8° to about 68.3° C.) for 15 to 20 minutes using the batch method or heating the solution to a temperature of between about 160° to 170° F. (about 71.1° to about 76.7° C.) for less than about 2 minutes using a plate heat exchanger; homogenizing the first solution using a two-stage homogenization process with a minimum second stage pressure of 500 psi, and a minimum total pressure of 3000 psi, preferably 4000 psi; cooling the solution to a temperature of less than about 50° F. (10° C.); in a separate container slowly adding a pectic substance to water which has been heated to a temperature of between about 170° F. to 180° F. (about 76.7° to 82.2° C.) to form a second solution; adding the second solution to the first solution and thoroughly mixing or blending the solutions for between about 5 minutes to about 10 minutes; bringing the final solution to a temperature of between about 45° to about 55° F. (7.2° to 12.8° C.) within 30 minutes or less and then slowly adding an edible acid diluted 50/50 with potable water under agitation to bring the pH of the final solution to between about 2.0 to about 5.5, preferably 4.20 to 4.40; agitating the final solution for an additional 20 minutes; adjusting the pH, if necessary; preheating the solution with a plate heat exchanger to a maximum temperature of between about 140° to 145° F. (60° to 62.8° C.) for less than about 2 minutes and homogenizing the solution using a two-stage homogenization process with a minimum second stage pressure of 500 psi, and a minimum total pressure of 3000 psi, preferably 4000 psi; immediately cooling the solution to less than 45° F. (7.2° C.); agitating the finished product for an additional 30 minutes before sampling and final standardization for attaining the intended nutritional result; then commercially sterilizing the solution using retort sterilization.

The final food composition, formulated as described, primarily comprises water and one or more of the following ingredients: mineral salts (buffers), stabilizers, antimicrobial agents, carbohydrates, anti-foaming agents, emulsifiers, oils, a protein source, pectic substances, edible acids, and one or more vitamins or minerals. The precise ingredients and amounts of each ingredient for each food composition produced according to the present invention may vary based on the dietary goal sought to be fulfilled and the protein source utilized. The pH of the food composition is from 2.0 to 5.5, preferably between about 4.2 to 4.4.

Using the novel process of the present invention, those skilled in the art can achieve a final liquid based, low pH, extended shelf life, nutritional food composition with high antimicrobial activity that satisfies most desired dietary goals. Accordingly, different desired food compositions may contain differing amounts of nutritional elements or omit certain ingredients altogether. However, as described herein, when an ingredient is used, the order of addition of ingredients during the process is important. Additionally, as described in more detail below, certain ingredients must be added in proportion to other ingredients.

DETAILED DESCRIPTION OF THE INVENTION

The present invention is a process for manufacturing a low pH, highly nutritional food composition, which is unusually stable at high temperatures and suitable for retort stabilization, with high antimicrobial activity and long shelf life when stored at room temperatures.

The process of the present invention begins by heating the desired volume or weight of potable water to a temperature of between about 120° to about 140° F. (about 48.9° to about 60° C.). While it may be possible to manufacture the food composition with other liquids, the base liquid will ordinarily be principally water. Additional ingredients such as alcohol, glycerol, propylene glycol, sugars and flavor may be added to the water. The ratio of water to composition will vary with the proportion of the ingredients of the composition and with the desired consistency required.

As would be appreciated by those of skill in the art, the amount of water admixed to produce a stable emulsion food composition can vary widely as desired. The amount of water mixed depends on the calories/ml desired, the desired viscosity of the resulting solution, etc. Water-based food compositions typically include from about 50% to about 95% by weight water.

Once the water reaches the desired temperature, one or more of mineral salts (buffers), stabilizers, antimicrobial agents (preservatives), minerals and vitamins are introduced with or into the water, preferably under high agitation. The resulting first solution is mixed for a period of between about 5 to about 10 minutes until all of the solids have been solubilized and the solution shows no visible undissolved particles.

Although mineral salts (buffers) are not always necessary, the food composition may include a desired amount of mineral salts, preferably monopotassium phosphate. Prior art water-based food compositions typically include about 0.005% to about 0.2% by weight of mineral salts.

The food composition includes a desired amount of stabilizer. The stabilizer is an ingredient or combination of ingredients that has a stabilizing effect on the final food composition and will keep the final food composition from changing over time. Generally, the stabilizer contributes to the uniformity or consistency of the final food composition by the stabilizer/protein interaction and the subsequent improved suspension of proteins and other ingredients. Thus, the stabilizer is protein specific and varies depending on the type of protein used. The amount of stabilizer varies proportionally to the amount of protein in the total food composition and the finished product's final viscosity as measured in centipoises. The preferred stabilizer for use in connection with milk proteins is a food grade stabilizer comprising between about 87.0% to about 98.0% by weight modified food starch, between about 2.0% to about 25.0% by weight cellulose gum, between about 0.5% to about 22.0% by weight calcium hydroxide and between about 0.025% to about 10.0% by weight carrageenan, such as GRINDSTED® SSD-5826 sold by Danisco Ingredients of New Century. GRINDSTED® SSD-5826 is a food grade stabilizer in powder form consisting of a proprietary mixture of modified food starch (derived from waxy maize), cellulose gum, calcium hydroxide and carrageenan which are reactive to milk proteins (specification sheet incorporated herein by reference). If the food composition is produced using soy proteins, a food grade stabilizer reactive to soy proteins must be utilized. Prior art water-based food compositions typically include about 0.01% to about 1.0% by weight of a stabilizer.

The food composition includes a desired amount of an antimicrobial agent or preservative. Any preservative that is effective in a low pH environment may be used. For example, sorbate or benzoate antimicrobial agents and preservatives such as sorbic acid, benzoic acid, potassium sorbate, sodium sorbate, potassium benzoate, sodium benzoate, and the like may be used. Such benzoates and sorbates are crucial because at low pH values in the range of 2.0 to 5.5, they provide significant antimicrobial activity. Prior art water-based food compositions typically include between about 0.025% to about 0.25% by weight of an antimicrobial agent or preservative. The preferred antimicrobial agent for use in conjunction with the present invention is potassium sorbate because it has been found particularly effective and provides a good source of potassium, an essential mineral.

A desired amount of vitamins, minerals, and other trace elements can be used to supplement the food composition and for purposes of total nutritional balance. These supplements can be varied as desired but are typically equal to the RDA or greater based on 2,000 calories. Prior art water-based food compositions typically include between 0.10% to about 0.75% by weight of vitamins, minerals and other trace elements. Soy bran, rice bran, arabic gum, or other fiber polysaccharides or sources of fiber can also be included in the food composition.

Conventional coloring agents, such as the FDA colors, may be used, as well as conventional preservatives, such as BHT and BHA. BHT and BHA preserve fats.

Once all of the solids have been solubilized, one or more of oils, emulsifiers, anti-foaming agents, proteins, and carbohydrates are added to the first solution, preferably under high agitation. These ingredients are preferably added from the least soluble to the most soluble, though these ingredients may be blended into the solution substantially contemporaneously.

A desired amount of any of a number of food grade oils may be used. All oils used must be introduced at temperatures above their melting points and can be added through a liquefier in order to enhance dispersability. A combination of MCT oil, canola oil and high-oleic safflower oil is preferred. The preferred MCT oil is sold by Abitec Corporation of Columbus, Ohio under the trademark CAPTEX 300®. Prior art water-based food compositions typically include between about 1.0% to about 10% by weight oil.

A desired amount of any food grade emulsifier which is effective in a low pH environment and fits the desired nutritional specifications of the end product may be used for present emulsification purposes and combinations of emulsifiers may be used if desired. The presently preferred emulsifier is lecithin, namely, CENTROLEX® F brand lecithin produced by Central Soya Company, Inc. of Fort Wayne, Ind. It is a powdered soybean lecithin consisting primarily of lipids, carbohydrates and ash. A combination of lecithin, monoglyceride and diglyceride is the preferred emulsifier for higher fat products. MYVATEX 8-06 K brand emulsifier, manufactured by Distilled Products Industries of Rochester, N.Y. and distributed by Quest international, is the preferred emulsifier for providing monoglycerides and diglycerides. It consists of approximately 80% monoglycerides and diglycerides and approximately 20% hydrogenated vegetable oil. The amount of the emulsifier is chosen to suit the particular food composition but is typically in direct proportion to the amount of oil used. Prior art water-based food compositions generally include between about 0.01% to about 0.5% by weight emulsifier.

As is well known in the art, if used in conjunction with the addition of one or more oils, emulsifiers should be added to the oil blend if possible, or to the solution proximate to the addition of the oils. Thus, if oils are added, emulsifiers should be added next and vice versa. Therefore an oil adding step may comprise either adding an emulsified oil blend, one or more oils alone, adding one or more oils simultaneously with one or more emulsifiers, or adding the oils and emulsifiers substantially contemporaneously.

Although an anti-foaming agent is not always necessary, any anti-foaming agent that is effective in a low pH environment may be used. In appropriate applications, the most effective anti-foaming agent has been found to be AF Emulsion produced by Dow Corning.

The protein source of the food composition may be selected from the group consisting of caseinates, milk protein concentrates and isolates comprised mostly of casein, milk protein hydrolystates, whey protein concentrates, whey protein isolates, whey protein hydrolystates, soy protein isolates or soy protein concentrates. The amount of protein used in the present food composition may vary widely. Prior art water-based food compositions typically include between about 2.0% to about 10.5% by weight protein. Any combination of one or more milk protein concentrates and isolates, such as milk protein comprised mostly of casein or caseinates such as calcium caseinate, sodium caseinate, calcium sodium caseinate, potassium caseinate or magnesium caseinate, may also be used. Alternatively, any combination of one or more of soy protein isolates or soy protein concentrates may be used.

The presently preferred milk protein source of the present invention is a blend of calcium caseinate and sodium caseinate or alternatively sodium caseinate alone. A blend of calcium caseinate and sodium caseinate is preferred because calcium caseinate provides nutritional benefits and sodium caseinate proteins are more tolerant of low pH ranges and have greater heat stability at low pH. Calcium caseinate and sodium caseinate are blended rather than using sodium calcium caseinate because it is easier to do stability tests on the proteins individually. When using a blend of calcium caseinate and sodium caseinate, it is preferable to use less calcium caseinate and more sodium caseinate because calcium caseinate proteins are more difficult to stabilize in low pH products that require a final thermal process. The preferred calcium caseinate used in the present invention is sold under the trademark ALANATE® 309 produced by New Zealand Milk Products of New Zealand. It is a spray-dried, flavor reduced milk protein processed specifically to reduce the thermophilic spore count, making it ideal for shelf-stable aseptic or retorted foods. The preferred sodium caseinate used in the present invention is sold as Sodium Caseinate Spray, or Sodium Caseinate S, produced by DMV of LaCrosse, Wis.

The presently preferred soy protein source of the present invention is soy protein isolates because they have high protein content, they are highly soluble and have bland flavor. The preferred soy protein isolate used in the present invention is sold under the trademark PROLISSE™ produced by Cargill, Inc. of Minneapolis, Minn.

The food composition contains a desired amount of carbohydrates. The carbohydrates may be any of the digestible carbohydrates such as dextrose, fructose, sucrose, maltose, oligosaccharides, high saccharides, or mixtures thereof, depending on usage. Prior art water-based food compositions typically include between about 5.0% to about 35% by weight of carbohydrates.

The preferred carbohydrate is Maltodextrin DE 10 because it provides a mild sweetener combined with a good source of carbohydrates. Maltodextrins are derived from corn starches. They are classified by dextrose equivalent or DE, which is a measure of the reducing sugars present calculated as dextrose and expressed as a percentage of the total dry substance. Maltodextrins can go up to 20 DE. At and above 20 DE, the product is classified as Corn Syrup Solids. The lower the DE, the less sweet and the more like starch the maltodextrin is. As the DE decreases from 20 to 1, the maltodextrins also decrease in solubility. Above a DE of 20, the product is corn syrup solids, is completely soluble, and therefore imparts significant sweetness. While DE is an important attribute, it is not the only one. Maltodextrins are also chosen based on their carbohydrate or saccharide profile. The profiles can be obtained from the individual supplier for their particular products. There is, however, a fairly constant relationship between the profiling and the particular DE and large differences between the vendor's profiles for a specific DE are not to be expected.

After blending all of the above components, the first solution is heated to a temperature of 145° to 155° F. (about 62.8° to about 68.3° C.) for 15 to 20 minutes using the batch method or a temperature of between about 160° to 170° F. (about 71.1° to about 76.7° C.) for less than about 2 minutes using a plate heat exchanger and homogenized using a two-stage homogenization process with a minimum second stage pressure of about 500 psi and a minimum total pressure of 3000 psi, preferably 4000 psi. Homogenization at this stage lowers the particle size of the components of the solution, emulsifies the fat and is essential in preparing the proteins for the final process. After the solution is homogenized, it is cooled to less than 50° F. (10° C.) using a plate heat exchanger.

In a separate container, a pre-measured amount of potable water is heated to a temperature of between about 170° to about 180° F. (76.7° to about 82.2° C.). Once the water reaches the desired temperature, a pectic substance is then slowly introduced into the water forming a second solution which is then thoroughly mixed. Care must be taken in hydrating pectin due to its tendency to clump rather than dissolve completely in solution. Presently, vigorous high sheer agitation is preferred to assist in hydrating the pectin.

Pectin has been found to stabilize milk and other directly acidified products. Milk is largely a suspension of water insoluble casein particles. At milk's ambient pH of 6.8, casein particles have a net negative charge. Having a negative charge, the casein particles repel each other. Thus, in milk or water, the casein particles are kept in suspension indefinitely through the Brownian motion of the water molecules. Similarly, pectin has also been found to stabilize soy proteins.

The pectic substance functions to prevent the precipitation of protein when the food composition formulated in accordance with the invention is brought to the desired pH and when undergoing commercial sterilization to kill substantially all pathogens in the food composition. In other words, the pectic substance has been found effective in preventing the coagulation, clustering and precipitation of protein in high temperature acidic conditions. Removing the protection afforded by the pectic substance results in increased agglomeration and the concomitant formation of undesirable precipitants.

Any pectic substance that prevents coagulation, clustering and precipitation of protein in high temperature acidic conditions may be used. The preferred pectin substance for use in connection with milk proteins is a specially formulated pectin for acidified milk-based drinks sold under the trademark GRINSTED pectin AMD 680. This proprietary pectic substance is a high-ester pectin standardized with sugars produced by Danisco Ingredients of New Century, Kans. (specification incorporated herein by reference). The amount of pectic substance used is directly proportional to the amount of protein in the food composition. Prior art water-based food compositions typically include between about 0.25% to about 1.5% by weight of a pectic substance derived from galcturonic acid.

Once the pectin has been hydrated, the second solution is then added to the first solution and the resulting final solution is thoroughly mixed for between 5 to 10 minutes.

After allowing the requisite agitation time for the formation of casein and pectin complexes in the emulsion, the final solution is brought to a critical temperature of between about 45° to about 55° F. (about 7.2° to about 12.8° C.) within 30 minutes or less. Then, edible acid, preferably, 88% lactic acid, diluted 50/50 with potable water is slowly added, preferably under high agitation to bring the final solution to the desired pH. The pH should be within the range of about 2.0 to about 5.5, preferably about 4.2 to about 4.4. This pH is critical to the extended shelf life of the invention. Any pH in excess of about 6 is not preferred because such pH allows greater microbial activity. Any food grade acid that lowers the pH of the mixture and has minimal impact on the protein may be used. The preferred acid is lactic acid. The final solution is then agitated for 20 minutes and if necessary, the pH is again adjusted. At this time, if the product is too viscous to pump through a plate heat exchanger it may have to be preheated to approximately about 60° to about 90° F. (15.6° to 32.2° C.).

Once titrated to the proper pH, the mixture is then quickly heated, preferably using a plate heat exchanger, to a maximum temperature of between about 140° to about 145° F. (60° to 62.8° C.) for less than about 2 minutes, and homogenized using a two-stage homogenization process with a minimum second stage pressure of about 500 psi and a minimum total pressure of 3000 psi, preferably 4000 psi. Homogenization at this stage aids in binding the pectic substance to the protein and further emulsification of the oils. Lower pressure homogenization processes are unsuitable as the pressure is not always sufficient to bind the pectic substance with the protein and ensure complete emulsification of the oils. Thus, this step is critical to the process of binding the pectin with the protein and ensuring complete emulsification of the oils. Immediately after homogenization, the mixture must be cooled to less than 45° F. (7.2° C.). Rapid cooling is critical to the stability of the acidified emulsion prior to retort sterilization. Cooling should take no longer than 5 minutes and is accomplished using a plate heat exchanger.

The finished product is then agitated for 30 minutes before sampling and final standardization. After 30 minutes of agitation, tests to determine the amount of protein, total solids, fat, and pH or other tests can be conducted for final standardizing. The product is standardized and kept at a temperature of less than 45° F. (7.2° C.). Samples will be pulled to run the complete vitamin/mineral analysis. All testing should be completed and the product should be packaged in less than about 72 hours.

Two to four hours prior to canning and retorting, the product will be checked for stability and Vitamin C (ascorbic acid) concentration, if in the formulation. At that time, Vitamin C, if included in the formulation, will be adjusted to be within desired specifications.

Finally, the stable emulsion food composition of the present invention is packaged and sterilized to a commercially acceptable degree using retort sterilization. A minimum of 8 hours after final standardizing is required before the finished product is packaged and sterilized. It is not recommended to wait more than 72 hours before the finished product is packaged and commercially sterilized because extensive agglomeration of protein and fat will occur resulting in a less stable final emulsion.

In the preferred embodiment, water for each batch is heated and stored in a stainless steel jacketed vessel (batch processor) with agitation, heating and cooling capabilities. Heavy-duty/high shear 50 hp liquifiers are used to optimize the incorporation of solids.

The order of the addition of the ingredients in the creation of the first solution of the present invention is important, as is the level of mixing and agitation. Generally, ingredients should preferably be added according to their level of solubility, the least soluble ingredients should be added first and the most soluble ingredients should be added last. First, buffers, if any, should be added to the water and solubilized early on so that there are no free ions in the water. Also, because certain minerals often have buffering benefits, it is important that they be added to the water at least before the addition of the protein source so that they can be fully solubilized in order to make sure that there are no free ions found in the water molecules. Next, the stabilizer should be added so that it is equally distributed through the water. After addition of the stabilizer, additional non-buffering vitamins, and preservatives may then be added.

After the previously described ingredients are thoroughly mixed, oils and emulsifier are added to the first solution, in either order. It is critical that the emulsifier be added immediately before or after addition of the oils so that the emulsifier can bind to the fat molecules.

Next, the anti-foaming agent, if any, is added followed by the protein. It is important to add the anti-foaming agent prior to the protein, otherwise the protein will foam in the solution.

Finally, carbohydrates and any other easily soluble ingredients are added. In some instances, such as when high protein products are produced, it is advantageous to make a carbohydrate/protein blend because the caseinate will be more soluble in a carbohydrate solution. It is also possible to add the carbohydrates prior to the protein when high protein products are produced because it helps solubilize the protein. Thus, the carbohydrates could also be added prior to the protein.

The caloric content of the food composition of the invention may be adjusted to any desired level up to about 3 calories per cubic centimeter.

The shelf life of food compositions produced according to the inventive process has been found to be greatly improved over prior art processes.

The food composition of the invention is ingested at any desired point along the digestive tract, but ordinarily is administered to a patient orally or is tubally fed directly into the patient's stomach. If appropriate, the reconstituted food composition can be tubally directly fed into the intestinal tract or the esophagus.

While several embodiments of the present invention have been disclosed, it is to be understood by those skilled in the art that other forms can be adopted, all coming within the spirit of the invention and scope of the appended claims.

I claim:

1. A method for preparing a shelf-stable food composition, said method comprising the steps of:
    (a) heating a first desired amount of water;
    (b) blending a desired amount of a stabilizer, comprising between about 87.0% to about 98.0% by weight modified food starch, between about 2.0% to about 25.0% by weight cellulose gum, between about 0.5% to about 22.0% by weight calcium hydroxide and between about 0.025% to about 10.0% by weight carrageenan, with the heated water to form a first solution;
    (c) blending a desired amount of a protein source into the first solution;
    (d) heating the first solution in preparation for a first homogenization;
    (e) homogenizing the first solution using a two-stage homogenizer with a minimum total pressure of 3000 psi;
    (f) cooling the first solution to a temperature of less than about 50° F.;
    (g) in a separate container, heating a second desired amount of water;
    (h) slowly adding a pectic substance to the second amount of heated water to form a second solution;
    (i) combining the first solution and second solution to form a final solution;
    (j) bringing the final solution to a temperature of between about 45° to about 55° F.;
    (k) slowing adding an edible acid to the final solution to bring the final solution to a pH of between about 2.0 to about 5.5;
    (l) heating the final solution in preparation for a second homogenization;
    (m) homogenizing the final solution using a two stage homogenizer with a minimum total pressure of 3000 psi;
    (n) cooling the final solution to less than 45° F.; and
    (o) sterilizing the food composition.

2. The method of claim 1 wherein the step of heating the first desired amount of water further comprises heating the first desired amount of water to between about 120° to about 140° F.

3. The method of claim 1 further comprising the step of blending a desired amount of a buffer into the heated water prior to blending in the stabilizer.

4. The method of claim 1 wherein the stabilizer has a food grade starch in a range intermediate about 87 to about 98%.

5. The method of claim 1 further comprising the step of agitating the first solution for between about 5 minutes to about 10 minutes after blending the stabilizer into the heated water.

6. The method of claim 1 further comprising the step of blending a desired amount of an antimicrobial agent into the first solution after the step of blending the stabilizer into the heated water.

7. The method of claims 6 wherein the antimicrobial agent is selected from the group consisting of potassium sorbate, ascorbic acid, benzoic acid, sodium sorbate, potassium benzoate, and sodium benzoate.

8. The method of claim 6 further comprising the step of agitating the first solution for between about 5 minutes to about 10 minutes after blending the antimicrobial agent into the first solution.

9. The method of claim 1 further comprising an oil adding step after the step of blending the stabilizer into the heated water.

10. The method of claim 9 wherein said oil adding step further comprises the substantially contemporaneous steps of blending a desired amount of one or more oils into the first solution and blending a desired amount of an emulsifier into the first solution.

11. The method of claim 9 wherein the oil is selected from the group consisting of multi-chain triglyceride oil, canola oil and high-oleic safflower oil.

12. The method of claim 9 wherein the emulsifier comprises lecithin.

13. The method of claim 9 wherein the emulsifier comprises lecithin, monoglycerides and diglycerides.

14. The method of claim 1 further comprising blending a desired amount of one or more carbohydrates into the first solution after the step of blending the stabilizer into the heated water.

15. The method of claim 14 wherein the carbohydrate is selected from the group consisting of corn syrup solids, trisaccharides, tetra-saccharides, pentasaccharides, hexasaccharides, dextrose, fructose, sucrose, maltose, oligosaccharides and higher saccharides.

16. The method of claim 1 further comprising the step of blending a desired amount of an anti-foaming agent into the first solution prior to blending in the protein source.

17. The method of claim 16 wherein the anti-foaming agent is anti-foaming emulsion.

18. The method of claim 1 wherein the protein source further comprises one or more proteins selected from the group consisting of milk protein isolates, milk protein concentrates comprised mostly of casein and caseinates.

19. The method of claim 1 wherein the protein source further comprises one or more proteins selected from the group consisting of sodium caseinate, calcium caseinate, sodium calcium caseinate, potassium caseinate, magnesium caseinate and any protein combination including a caseinate.

20. The method of claim 1 wherein the protein source comprises one or more carbohydrates preblended with the protein source.

21. The method of claim 1 wherein the step of heating the first solution in preparation for a first homogenization further comprises heating the first solution to a temperature of between about 145° to about 155° F. for between about 15 to 20 minutes using the batch method.

22. The method of claim 1 wherein the step of heating the first solution in preparation for homogenization further comprises heating the first solution to a temperature of between about 160° to about 170° F. for less than about 2 minutes using a plate heat exchanger.

23. The method of claim 1 wherein the first homogenizing step uses a two stage homogenizer with a minimum total pressure of 4000 psi.

24. The method of claim 1 wherein the step of combining the first solution and second solutions to form a final solution further comprises thoroughly mixing the solutions for between about 5 to about 10 minutes.

25. The method of claim 1 wherein the step of heating the second desired amount of water further comprises heating the second desired amount of water to between about 170° to about 180° F.

26. A method of claim 1 wherein the pectic substance is normally principally directed to acidified milk-based drinks.

27. The method of claim 1 wherein the step of bringing the final solution to a temperature of between about 45° to about 55° F. is effected within 30 minutes or less.

28. The method of claim 1 wherein the edible acid is added to the final solution under agitation.

29. The method of claim 1 wherein the edible acid is lactic acid.

30. The method of claim 1 wherein the step of adding an edible acid to the final solution brings the final solution to a pH of between about 4.2 to about 4.4.

31. The method of claim 1 further comprising the step of maintaining agitation of the final solution after addition of the edible acid for between about 15 to about 25 minutes.

32. The method of claim 1 wherein the step of heating the second solution in preparation for homogenization further comprises heating the second solution to a maximum temperature of between about 140° to about 145° F. for less than about 2 minutes.

33. The method of claim 1 wherein the second homogenizing step uses a two stage homogenizer with a minimum total pressure of 4000 psi.

34. The method of claim 1 wherein the step of cooling the final solution to less than 45 F is effected within about 5 minutes.

35. The method of claim 1 further comprising the step of agitating the final solution for an additional 15 to about 45 minutes after the cooling step.

36. The method of claim 1 wherein the sterilizing step comprises retort sterilization.

37. The method of claim 1 further comprising the step of blending one or more minerals into the unsterilized food composition any time prior to sterilization.

38. The method of claim 1 further comprising the step of blending one or more vitamins into the unsterilized food composition any time prior to sterilization.

39. A method for preparing a shelf-stable food composition, said method comprising the ordered steps of:
(a) heating a first desired amount of water;
(b) blending a desired amount of a buffer into the heated water;
(c) blending a desired amount of a stabilizer, comprising between about 87.0% to about 98.0% by weight modified food starch, between about 2.0% to about 25.0% by weight cellulose gum, between about 0.5% to about 22.0% by weight calcium hydroxide and between about 0.025% to about 10.0% by weight carrageenan, with the heated water to form a first solution;
(d) blending a desired amount of an antimicrobial agent into the first solution;
(e) agitating the first solution for between about 5 minutes to about 10 minutes;
(f) adding a desired amount of one or more oils into the first solution;
(g) blending a desired amount of a protein source into the first solution;
(h) blending a desired amount of one or more carbohydrates into the first solution;
(i) heating the first solution in preparation for a first homogenization;
(j) homogenizing the first solution using a two-stage homogenizer with a minimum total pressure of 3000 psi;
(k) cooling the first solution to a temperature of less than about 50° F.;
(l) in a separate container, heating a second desired amount of water;
(m) slowly adding a pectic substance to the second amount of heated water to form a second solution;
(n) combining the first solution and second solution by mixing the solutions for between about 5 to about 10 minutes to form a final solution;
(o) bringing the final solution to a temperature of between about 45° to about 55° F.;
(p) slowing adding an edible acid to the final solution under agitation to bring the final solution to a pH of between about 2.0 to about 5.5;
(q) maintaining agitation of the final solution for between about 15 to about 25 minutes;
(r) heating the final solution in preparation for a second homogenization;
(s) homogenizing the final solution using a two stage homogenizer with a minimum total pressure of 3000 psi;
(t) cooling the final solution to less than 45° F.;
(u) agitating the final solution for between about 15 to about 45 minutes; and
(v) sterilizing the food composition.

40. The method of claim 39 wherein the protein source further comprises one or more proteins selected from the group consisting of milk protein hydrolystates, whey protein concentrates, whey protein isolates and whey protein hydrolystates.

41. The method of claim 39 wherein the step of heating the first desired amount of water further comprises heating the first desired amount of water to between about 120° to about 140° F.

42. The method of claim 39 wherein the stabilizer has a food grade starch in a range intermediate about 87 to about 98 percent.

43. The method of claim 39 wherein the antimicrobial agent is selected from the group consisting of potassium sorbate, ascorbic acid, benzoic acid, sodium sorbate, potassium benzoate, and sodium benzoate.

44. The method of claim 39 wherein said oil adding step further comprises the substantially contemporaneous steps of blending a desired amount of one or more oils into the first solution and blending a desired amount of an emulsifier into the first solution.

45. The method of claim 39 wherein the oil is selected from the group consisting of MCT oil, canola oil and high-oleic safflower oil.

46. The method of claim 44 wherein the emulsifier comprises lecithin.

47. The method of claim 44 wherein the emulsifier comprises lecithin, monoglycerides and diglycerides.

48. The method of claim 39 wherein the carbohydrate is selected from the group consisting of corn syrup solids, trisaccharides, tetra-saccharides, pentasaccharides, hexasaccharides, dextrose, fructose, sucrose, maltose, oligosaccharides and higher saccharides.

49. The method of claim 39 further comprising the step of blending a desired amount of an anti-foaming agent into the first solution prior to blending in the protein source.

50. The method of claim 49 wherein the anti-foaming agent is anti-foaming emulsion.

51. The method of claim 39 wherein the protein source further comprises one or more proteins selected from the group consisting of milk protein isolates, milk protein concentrates comprised mostly of casein and caseinates.

52. The method of claim 39 wherein the protein source further comprises one or more proteins selected from the group consisting of sodium caseinate, calcium caseinate, sodium calcium caseinate, potassium caseinate, magnesium caseinate and any protein combination including a caseinate.

53. The method of claim 39 wherein the protein source comprises one or more carbohydrates preblended with the protein source.

54. The method of claim 39 wherein the step of heating the first solution in preparation for a first homogenization further comprises heating the first solution to a temperature of between about 145° to about 155° F. for between about 15 to 20 minutes using the batch method.

55. The method of claim 39 wherein the step of heating the first solution in preparation for homogenization further comprises heating the first solution to a temperature of between about 160° to about 170° F. for less than about 2 minutes using a plate heat exchanger.

56. The method of claim 39 wherein the first homogenizing step uses a two stage homogenizer with a minimum total pressure of 4000 psi.

57. The method of claim 39 wherein the step of heating the second desired amount of water further comprises heating the second desired amount of water to between about 170° to about 180° F.

58. The method of claim 39 wherein the pectic substance is GRINSTED® pectin AMD 680.

59. The method of claim 39 wherein the step of bringing the final solution to a temperature of between about 45° to about 55° F. is effected within 30 minutes or less.

60. The method of claim 39 wherein the edible acid is lactic acid.

61. The method of claim 39 wherein the step of adding an edible acid to the final solution brings the final solution to a pH of between about 4.2 to about 4.4.

62. The method of claim 39 wherein the step of heating the second solution in preparation for homogenization further comprises heating the second solution to a maximum temperature of between about 140° to about 145° F. for less than about 2 minutes.

63. The method of claim 39 wherein the first homogenizing step uses a two stage homogenizer with a minimum total pressure of 4000 psi.

64. The method of claim 39 wherein the step of cooling the final solution to less than 45° F. is effected within about 5 minutes.

65. The method of claim 39 wherein the sterilizing step comprises retort sterilization.

66. The method of claim 39 further comprising the step of blending one or more minerals into the unsterilized food composition any time prior to sterilization.

67. The method of claim 39 further comprising the step of blending one or more vitamins into the unsterilized food composition any time prior to sterilization.

68. The method of claim 9 wherein said oil adding step further comprises blending a prefabricated blend of one or more oils and an emulsifier into the first solution.

69. The method of claim 39 wherein said oil adding step further comprises blending a prefabricated blend of one or more oils and an emulsifier into the first solution.

70. A method for preparing a shelf-stable food composition, said method comprising the steps of:
  (a) heating a first desired amount of water;
  (b) blending a desired amount of a stabilizer;
  (c) blending a desired amount of soy protein into the first solution;
  (d) heating the first solution in preparation for a first homogenization;
  (e) homogenizing the first solution using a two-stage homogenizer with a minimum total pressure of 3000 psi;
  (f) cooling the first solution to a temperature of less than about 50° F.;
  (g) in a separate container, heating a second desired amount of water;
  (h) slowly adding a pectic substance to the second amount of heated water to form a second solution;
  (i) combining the first solution and second solution to form a final solution;
  (j) bringing the final solution to a temperature of between about 45° to about 55° F.;
  (k) slowing adding an edible acid to the final solution to bring the final solution to a pH of between about 2.0 to about 5.5;
  (l) heating the final solution in preparation for a second homogenization;
  (m) homogenizing the final solution using a two stage homogenizer with a minimum total pressure of 3000 psi;
  (n) cooling the final solution to less than 45° F.; and
  (o) sterilizing the food composition.

71. The method of claim 70 wherein the step of heating the first desired amount of water further comprises heating the first desired amount of water to between about 120° to about 140° F.

72. The method of claim 70 further comprising the step of blending a desired amount of a buffer into the heated water prior to blending in the stabilizer.

73. The method of claim 70 wherein the stabilizer is soy protein specific.

74. The method of claim 70 further comprising the step of agitating the first solution for between about 5 minutes to about 10 minutes after blending the stabilizer into the heated water.

75. The method of claim 70 further comprising the step of blending a desired amount of an antimicrobial agent into the first solution after the step of blending the stabilizer into the heated water.

76. The method of claims 75 wherein the antimicrobial agent is selected from the group consisting of potassium sorbate, ascorbic acid, benzoic acid, sodium sorbate, potassium benzoate, and sodium benzoate.

77. The method of claim 75 further comprising the step of agitating the first solution for between about 5 minutes to about 10 minutes after blending the antimicrobial agent into the first solution.

78. The method of claim 70 further comprising an oil adding step after the step of blending the stabilizer into the heated water.

79. The method of claim 78 wherein said oil adding step further comprises the substantially contemporaneous steps of blending a desired amount of one or more oils into the first solution and blending a desired amount of an emulsifier into the first solution.

80. The method of claim 78 wherein the oil is selected from the group consisting of MCT oil, canola oil and high-oleic safflower oil.

81. The method of claim 78 wherein the emulsifier comprises lecithin.

82. The method of claim 78 wherein the emulsifier comprises lecithin, monoglycerides and diglycerides.

83. The method of claim 78 further comprising blending a desired amount of one or more carbohydrates into the first solution after the step of blending the stabilizer into the heated water.

84. The method of claim 83 wherein the carbohydrate is selected from the group consisting of corn syrup solids, trisaccharides, tetra-saccharides, pentasaccharides, hexasaccharides, dextrose, fructose, sucrose, maltose, oligosaccharides and higher saccharides.

85. The method of claim 70 further comprising the step of blending a desired amount of an anti-foaming agent into the first solution prior to blending in the protein source.

86. The method of claim 85 wherein the anti-foaming agent is anti-foaming emulsion.

87. The method of claim 70 wherein the protein source comprises one or more proteins selected from the group consisting of soy protein isolates and soy protein concentrates.

88. The method of claim 70 wherein the protein source comprises one or more carbohydrates preblended with the protein source.

89. The method of claim 70 wherein the step of heating the first solution in preparation for a first homogenization further comprises heating the first solution to a temperature of between about 145° to about 155° F. for between about 15 to 20 minutes using the batch method.

90. The method of claim 70 wherein the step of heating the first solution in preparation for homogenization further comprises heating the first solution to a temperature of between about 160° to about 170° F. for less than about 2 minutes using a plate heat exchanger.

91. The method of claim 70 wherein the first homogenizing step uses a two stage homogenizer with a minimum total pressure of 4000 psi.

92. The method of claim 70 wherein the step of combining the first solution and second solutions to form a final solution further comprises thoroughly mixing the solutions for between about 5 to about 10 minutes.

93. The method of claim 70 wherein the step of heating the second desired amount of water further comprises heating the second desired amount of water to between about 170° to about 180° F.

94. The method of claim 70 wherein the step of bringing the final solution to a temperature of between about 45° to about 55° F. is effected within 30 minutes or less.

95. The method of claim 70 wherein the edible acid is added to the final solution under agitation.

96. The method of claim 70 wherein the edible acid is lactic acid.

97. The method of claim 70 wherein the step of adding an edible acid to the final solution brings the final solution to a pH of between about 4.2 to about 4.4.

98. The method of claim 70 further comprising the step of maintaining agitation of the final solution after addition of the edible acid for between about 15 to about 25 minutes.

99. The method of claim 70 wherein the step of heating the second solution in preparation for homogenization further comprises heating the second solution to a maximum temperature of between about 140° to about 145° F. for less than about 2 minutes.

100. The method of claim 70 wherein the second homogenizing step uses a two stage homogenizer with a minimum total pressure of 4000 psi.

101. The method of claim 70 wherein the step of cooling the final solution to less than 45 F is effected within about 5 minutes.

102. The method of claim 70 further comprising the step of agitating the final solution for an additional 15 to about 45 minutes after the cooling step.

103. The method of claim 70 wherein the sterilizing step comprises retort sterilization.

104. The method of claim 70 further comprising the step of blending one or more minerals into the unsterilized food composition any time prior to sterilization.

105. The method of claim 70 further comprising the step of blending one or more vitamins into the unsterilized food composition any time prior to sterilization.

106. The method of claim 1 wherein the protein source further comprises one or more proteins selected from the group consisting of milk protein hydrolystates, whey protein concentrates, whey protein isolates and whey protein hydrolystates.

* * * * *